United States Patent [19]

Lake

[11] Patent Number: 4,579,382

[45] Date of Patent: Apr. 1, 1986

[54] LIFT-ROOF TRAILER

[75] Inventor: William H. R. Lake, Lathrup Village, Mich.

[73] Assignee: Trail-R-Van Inc., Lathrup Village, Mich.

[21] Appl. No.: 596,733

[22] Filed: Apr. 4, 1984

Related U.S. Application Data

[63] Continuation-in-part of Ser. No. 474,963, Mar. 14, 1983, Pat. No. 4,533,171.

[51] Int. Cl.$^4$ ............................................. B62D 25/20
[52] U.S. Cl. ................................. 296/181; 296/204; 280/475
[58] Field of Search ............... 296/182, 181, 204, 205, 296/187, 188, 26, 27; 280/475

[56] References Cited

U.S. PATENT DOCUMENTS

| | | | |
|---|---|---|---|
| 2,153,058 | 4/1939 | Bashor | 296/182 |
| 2,207,812 | 7/1940 | McClellan | 280/475 |
| 2,892,635 | 6/1959 | Hustead | 296/181 |
| 3,582,131 | 6/1971 | Brown | 296/27 |
| 3,643,975 | 2/1972 | Parkhurst | 280/475 |
| 4,035,015 | 7/1977 | Smith | 296/181 |
| 4,043,583 | 8/1977 | Tidwell, Jr. | 296/181 |
| 4,165,117 | 8/1979 | Kaiser | 296/27 |
| 4,167,284 | 9/1979 | Messina | 296/171 |

Primary Examiner—Robert R. Song

[57] ABSTRACT

A flat-floored trailer having wheels, a load bed and coupling structure assembly including a load floor structure having a lateral cross section in the form of an "inverted top hat" and comprising a central rectangular floor panel attached by suitable fastener means along each longitudinal edge to the lower horizontal flange of a formed panel incorporating a lateral section of "Z" form with a vertical wall joining the lower horizontal flange to an upper horizontal flange or floor surface; the right formed "Z" section panel being a mirror image form of the left formed "Z" section panel and each formed panel being shaped in a parallel configuration of bends and edges and being of approximately the same length as the central rectangular floor panel;

the load bed being attached to an "A" frame coupling structure comprising left and right structural bar legs joined at their forward ends to a common coupling bracket and joined toward, but forward of, their rearward ends to a common structural bar cross member; the "A" frame coupling structure being attached to a forward end of the load bed at locations in proximity to the joints between the structural bar cross member and the left and right structural bar legs and being attached at the rearward ends of the left and right structural bar legs to a forward lateral support structure toward the left and right edges of the support structure outboard of the formed panel vertical walls and below the formed panel upper horizontal flange or floor surfaces.

4 Claims, 20 Drawing Figures

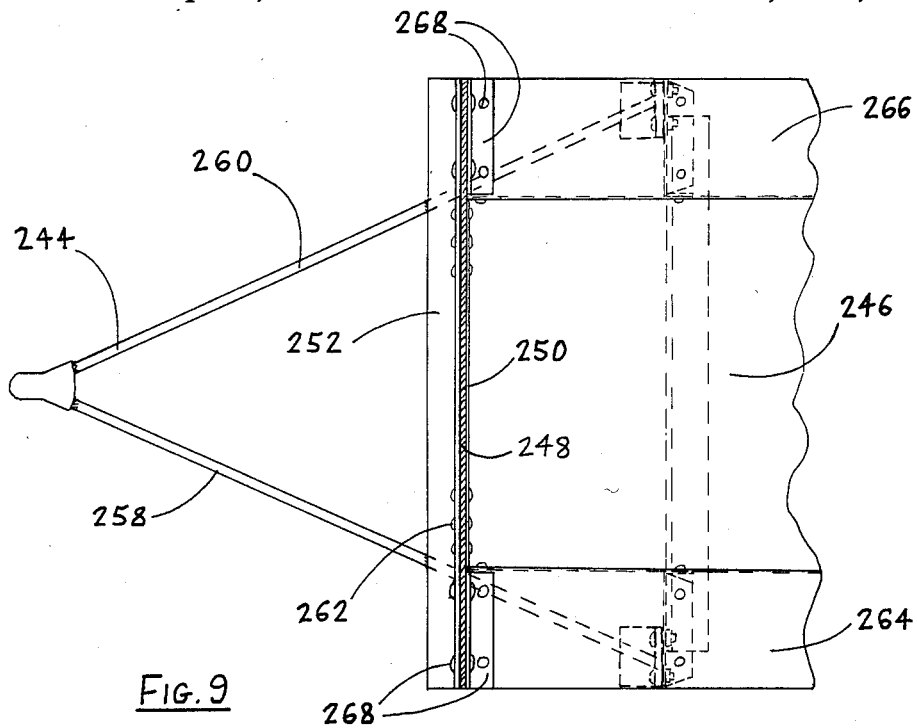
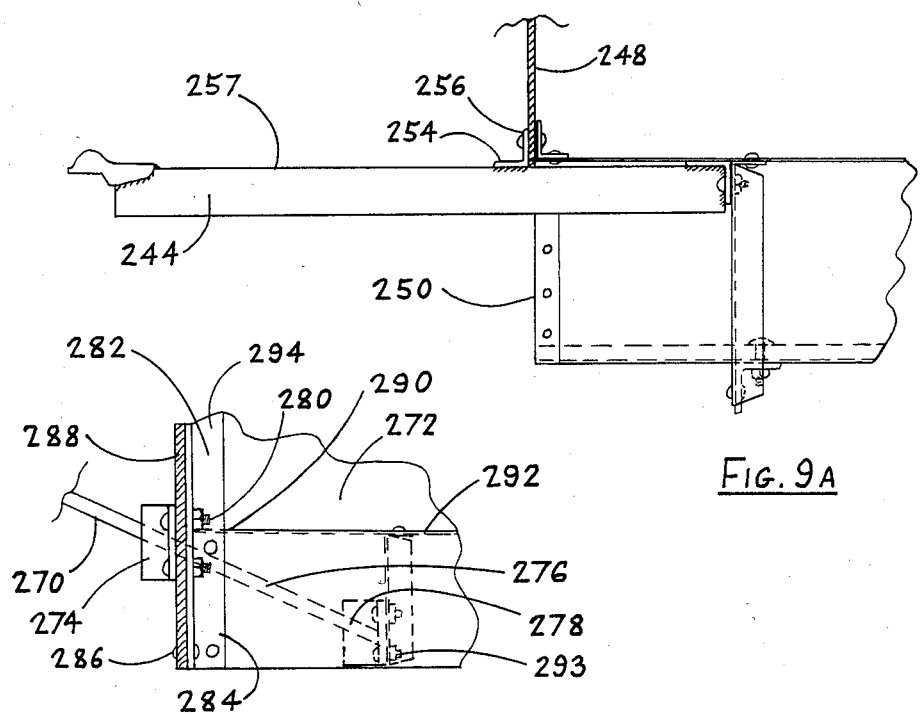
FIG. 9
FIG. 9A
FIG. 10

LIFT-ROOF TRAILER

BACKGROUND OF THE INVENTION

This application is a continuation-in-part of the patent application for a Lift-roof Trailer, application Ser. No. 474,963, Patent and Trademark mail date Mar. 14, 1983, now U.S. Pat. No. 4,533,171, and describes an Improved Load Bed and Coupling Structure Assembly, where by "load bed and coupling structure assembly" is meant the main substructure of a trailer, including the coupling structure used to provide attachment of the trailer to the tow vehicle and all load floors, load-containing walls and their supporting structures where essential to the load-supporting function of the trailer, but excluding wheels, axles, suspension components and body components which are non-essential to the load-supporting function of the trailer.

The improved load bed and coupling structure assembly comprises a substructure which optimises the advantages described for the Lift-roof Trailer in the parent application Ser. No. 474,963. It will further be noted that a preliminary description of said improved load bed and coupling structure assembly was documented in Disclosure Document No. 111664, Patent and Trademark Office mail date Oct. 6, 1982.

In particular, the improved load bed and coupling structure assembly adds to the lift-roof trailer concept by employing a low cost, simplified, lightweight construction form which provides (1) a low floor height allowing improved ease of access with a low roofline for a given interior height and (2) interior floor surfaces which extend approximately to the full trailer width, allowing maximum usable space within given trailer exterior dimensions.

In the prior art, flat floor trailers commonly have incorporated heavy longitudinal frame members of full load floor length joined to lateral frame members or cross members and to a forward coupling structure in the form of either a single-member tongue or a two-member "A" frame. In combination, the longitudinal members, crossmembers and coupling structure make up a frame structure which provides the major portion of the rigidity which is critical to the loadcarrying functions of the trailer.

The frame members commonly are made from lengths of readily available structural metal bar of alternate cross-sectional form, but having wall thickness significantly greater than the thickness of metal panelling used typically in the cargo body or floor construction of such trailers. Because a trailer load bed, for efficient function, will generally have a length which is greater than its width, longitudinal frame members need, in the prior art, to be of a heavier and/or deeper cross sectional form than is necessary for crossmembers, if it is required that load carrying functions be performed within approximately the same material maximum stress limits.

To perform their required loadcarrying functions, the longitudinal frame members must extend most or all of the length of the load bed. Therefore, the longitudinal frame members must usually pass in proximity to, and limit the location of, axle or suspension components which move with vertical wheel deflections. Readily available structural bars conventionally employed as longitudinal frame members have cross sections of significant height and width, being commonly of rectangular, channel or I sectional form. Therefore, if positioned under the load floor, the longitudinal frame members add to trailer frontal area and/or detract from cargo space by requiring a higher floor height than might otherwise be necessary. If positioned outboard of the cargo area, the longitudinal frame members reduce the available cargo volume between wheels and/or add to frontal area by requiring wider spacing of the wheels. The structural cross section type of longitudinal frame members commonly employed in the prior art can therefore be understood to both add weight and detract from load volume capacity within given trailer overall dimensions.

The trailer gross weight and frontal area are limited by the towing capabilities and desired fuel economy of the tow vehicle. The effects on trailer weight and frontal area of the longitudinal frame members are therefore partial determinants of maximum load capacity and of fuel economy in operation.

Accordingly, a general object of my invention is to provide a concept for a load bed and coupling structure assembly which eliminates need for use of heavy, space consuming longitudinal frame members together with associated cost, weight and package limitations and allows efficiency, convenience and safety advantages for low cost flat floor trailers better suited to the transportation needs of the post-Energy-Crisis era.

SUMMARY OF THE INVENTION

Where functional efficiency and cost have been concerns, manufacturers of flat floor load trailers have sought to incorporate most of the following features:

(1) Longitudinal structural members and floor panels forming a lateral section of full load bed width which extends the full length of the load bed without variation, (2) Accomodation of cargo to the maximum feasible trailer width as determined by the dimension across the outsides of the tires, (3) A load floor which is as low as allowed by requirements for ground clearance, (4) Longitudinal structural members which do not significantly detract from package space otherwise available for cargo use, (5) Frame members which add minimal weight beyond that required by the normal load functions of floor and wall panels, (6) A simple straight leg coupling structure attached to the load bed by simple means, without need for complex fabrication or reinforcement measures.

A review of the prior art has not revealed means by which all of the above features have been accomodated within a simple, low cost, flat floor trailer design. It follows that a concept which accomodates all of the above features may be considered an improved load bed and coupling structure assembly. Accordingly, several objects of my invention are to incorporate into a simple flat floor trailer structural concept all of the six desired features heretofore described and, hence, to provide a combination of the following advantages over the prior art:

(1) Simplification of manufacturing and reduction in cost by
(a) eliminating materials and processing associated with use of heavy gage longitudinal frame members, (b) accomodating simple attachment of an "A" frame coupling structure with straight legs requiring no forming, (c) facilitating the use of standard sized materials with minimal processing and waste;

(2) Availability of operational efficiency improvements due to (a) weight savings which may be applied to provide increased cargo weight capacity and/or provide improved fuel economy by reducing power to maintain equivalent performance levels and/or (b) package space savings which may be applied to increase cargo volume capacity within given exterior dimensions and/or reduce overall dimensions to provide improved fuel economy associated with reduced aerodynamic drag;

(3) Availability of improved convenience and safety in use by (a) allowing a lighter trailer relative to load capacity, hence facilitating handling when not in tow, (b) allowing a trailer, which for a given load volume capacity is lower in overall height, reducing storage space requirements when not in use and allowing improved rearward visibility with a given load volume, (c) allowing a reduction in gross weight relative to load capacity, resulting in reduced braking loads on the tow vehicle, (d) allowing a lower center of gravity, resulting in improved dynamic stability in use.

To achieve the described advantages, structural components of the load bed and coupling structure assembly are employed in a unique configuration whereby major load stresses are more widely distributed than is feasible in the prior art. The use of local load-supporting (floor) and load-containing (wall) panels to carry major load stresses is made possible by first arranging them to form a structure which directly absorbs major vertical bending loads and distributes reactive tensile and compressive stresses more widely than is possible with use of conventional separate longitudinal frame members for this purpose. Further, a unique geometric configuration is employed in attachment of a simple "A" frame coupling structure to the load bed panels so that reactive stresses resulting from the torsional rigidity imparted by the "A" frame coupling structure are also more widely distributed than is feasible via the prior art. The wider distribution of stresses allows given loads to be carried within acceptable material stress levels with lower cross sectional areas and, therefore, lighter structural members than are otherwise possible.

BRIEF DESCRIPTION OF THE DRAWINGS

FIG. 9 is a plan view of a preferred attachment of an "A" frame coupling structure to the forward end of a load bed assembly.

FIG. 9a is a side view of the preferred attachment of an "A" frame coupling structure shown in FIG. 9.

FIG. 10 is a fractional plan view of an alternate attachment of an "A" frame coupling structure at the left side of a load bed.

DETAILED DESCRIPTION OF THE PREFERRED EMBODIMENTS

Figure 1:
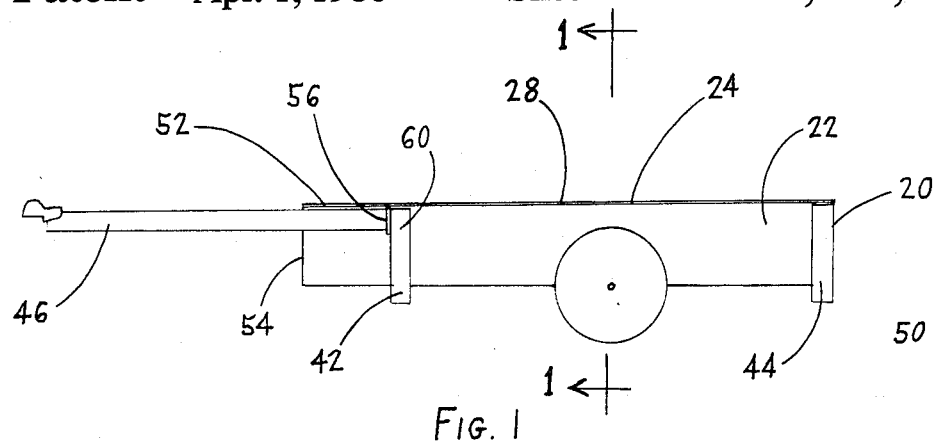
FIG. 1 is a simplified side view of a preferred load bed and coupling structure assembly, also showing tire locations.
Figure 1A:
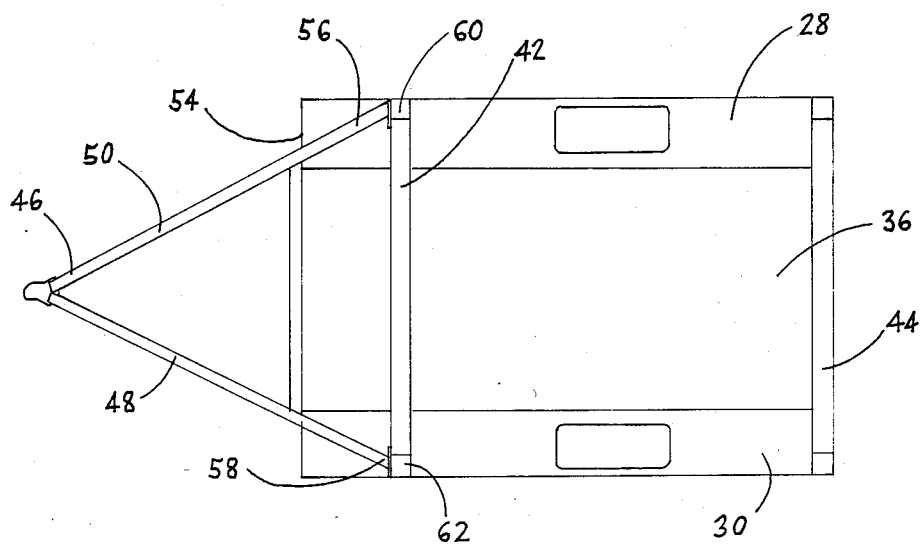
FIG. 1a is a bottom view of the load bed and coupling structure assembly shown in FIG. 1.
Figure 1B:
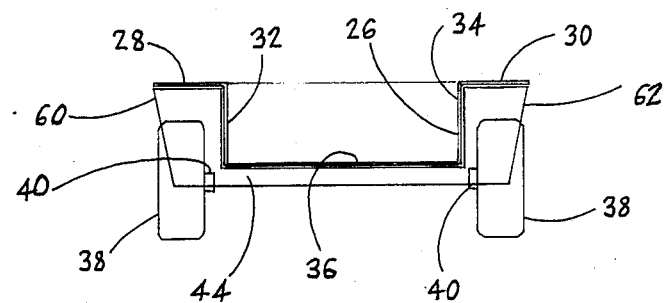
FIG. 1b is a lateral sectional view along lines 1—1 of FIG. 1.

Referring to FIGS. 1, 1a, 1b; a load bed 20 embodies panelling 22 in such a way as to create a load floor structure 24 having a uniform cross section in the form of an inverted top hat 26 which extends the full length of the load bed 20 and includes left and right upper floors 28,30 respectively, joined to left and right walls 32,34 respectively, said walls 32,34 being joined further to a central floor 36; the dimensions of said walls 32,34 and floors 28,30,36 being determined primarily by dimensions and clearance requirements for tires 38 and associated suspension components 40.

In order to maintain the required inverted top hat cross section 26 uniformly along the length of the load bed 20, the panelling 22 which comprises said cross section 26 is attached to rigid front and rear lateral support structures 42,44, respectively, which locate the central floor 36, vertical walls 32,34 and upper floors 28,30 in the required inverted top hat cross sectional relationship.

To provide adequate torsional rigidity for satisfactory loadcarrying function under operating conditions, an "A" frame coupling structure 46 having straight legs 48,50 is rigidly attached to the forward part 52 of the load bed 20. The "A" frame legs 48,50 extend rearward from the leading edge 54 of the load bed 20 outboard of the central floor 36 and walls 32,34 and under the left and right upper floor surfaces 28,30, and are attached at their rearward ends 56,58 to the outer ends 60,62 of the forward lateral support structure 42.

Figure 2:
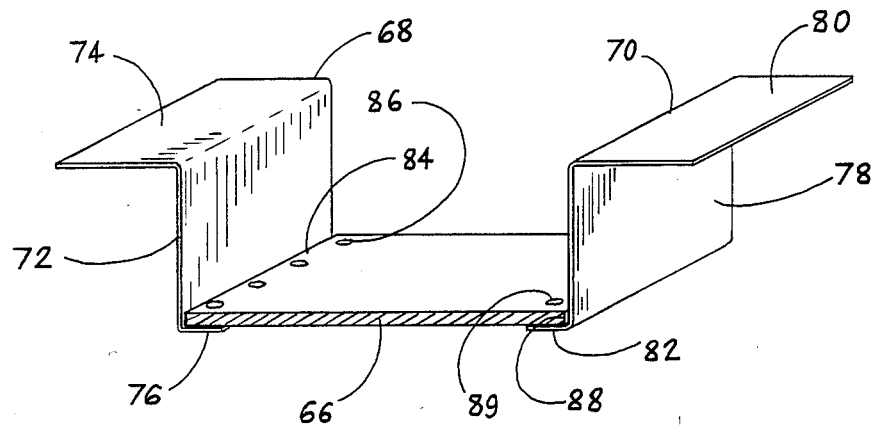
FIG. 2 is a perspective view of a preferred load floor structure assembly.

Referring to FIG. 2; a preferred load floor structure 64 of inverted top hat cross sectional form comprises a central rectangular floor panel 66, a left formed light gage panel 68 and a right formed light gage panel 70 which is a mirror image form of said left formed light gage panel 68. In the preferred design, the formed panels 68,70 are approximately of the same length as the central floor panel 66, are generally of rectangular shape prior to forming and are formed in parallel configurations of bends and edges.

The left formed panel 68 has a left main vertical wall 72 joining a left upper horizontal floor or flange 74 and a left lower horizontal floor or flange 76. The right formed panel 70 has a cross sectional form which is a mirror image of the cross sectional form of the left formed panel 68, having a main vertical wall 78 joining a right upper horizontal floor or flange 80 and a right lower horizontal floor or flange 82. The central floor panel 66 is attached along the length of its left edge 84 by suitable fastener means 86 to said left lower horizontal flange 76 of said left formed panel 68 and is attached along the length of its right edge 88 by suitable fastener means 89 to said right lower horizontal flange 82 of said right formed panel 70.

Wide distribution of reactive tensile and compressive stresses resulting from primary vertical bending loads is achieved because maximum reactive tensile stresses are carried in the region of the upper floors 74,80 whereas the maximum reactive compressive stresses are carried in the region of the central floor 66. The structural integrity which is necessary to satisfactorily distribute stresses between the upper floors 74,80 and central floor 66 is provided by integrating all or a part of the floors 66,74,80 with the vertical walls 72,78 in formed light gage panelling incorporating "Z" form cross sections 68,70 at each side of the central floor 66.

Figures 3, 4, 5, 6:
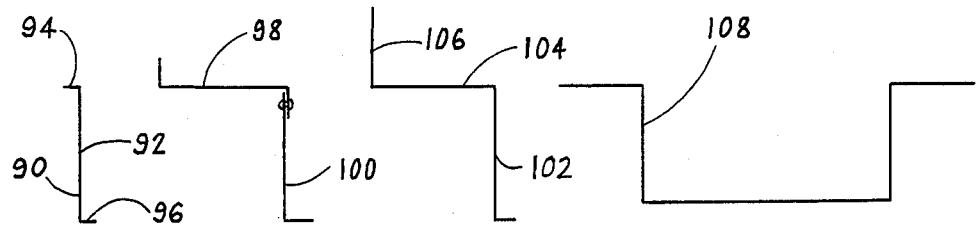
FIG. 3, FIG. 4, FIG. 5, FIG. 6 show various alternate panel forms which incorporate a "Z" form.

FIG. 3 shows a typical minimum "Z" section form 90 with a vertical wall 92 joining horizontal surfaces 94,96 for operational integrity of the load floor structure (24 of FIG. 1). FIGS. 4, 5, 6 show some of the alternate cross-sectional forms which incorporate the minimum "Z" form 90. Such alternate forms might include the combination of two adequately joined "L" form sections 98,100; a "W" form section 102 incorporating a full upper floor 104 with an upper vertical wall 106; a one-piece inverted top hat form section 108.

Figure 7:
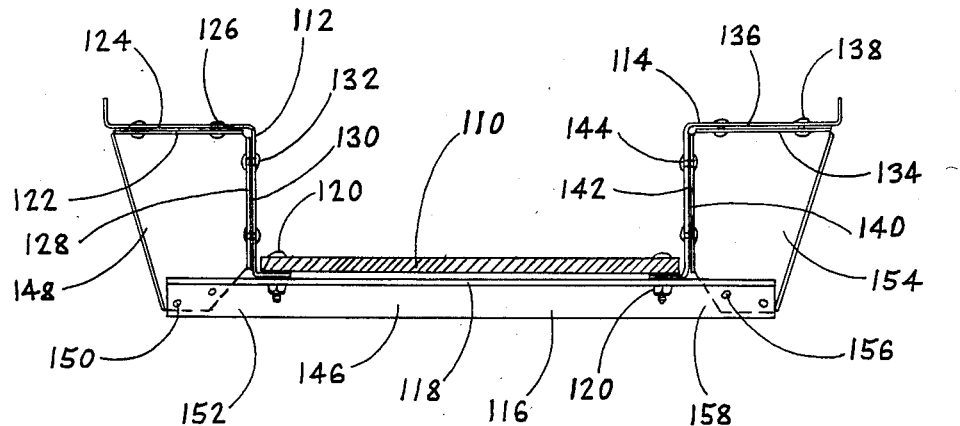
FIG. 7 is a lateral sectional view of a preferred load bed assembly, including formed side panels, floor panels and lateral support structures.

Referring to FIG. 7; a central floor panel 110, a left formed panel 112 and a right formed panel 114 are supported in the inverted top hat cross-sectional relationship by attachment to rigid lateral support structures 116. Said lateral support structures 116 each include a central horizontal surface 118 for supporting and attaching said central floor panel 110 with suitable fastener means 120, a left upper horizontal surface 122 for supporting and attaching a left upper horizontal floor surface 124 of said left formed panel 112 with suitable fastener means 126, a left vertical surface 128 for supporting and/or attaching the main vertical wall 130 with suitable fastener means 132, a right upper horizontal surface 134 for supporting and attaching a right upper horizontal floor surface 136 of said right formed panel 114 with suitable fastener means 138 and a right vertical surface 140 for supporting or attaching the right main vertical wall 142 with suitable fastener means 144.

Each lateral support structure, in the preferred form, is made up from a length of structural bar 146 of angle, channel or rectangular tube cross section with a formed light gage left support bracket 148 attached with suitable fastener means 150 to the left end 152 of said structural bar 146, and a formed light gage right support bracket 154 which is a mirror image form of said light gage left support bracket 148, attached with suitable fastener means 156 to the right end 158 of said structural bar 146.

Figure 8:
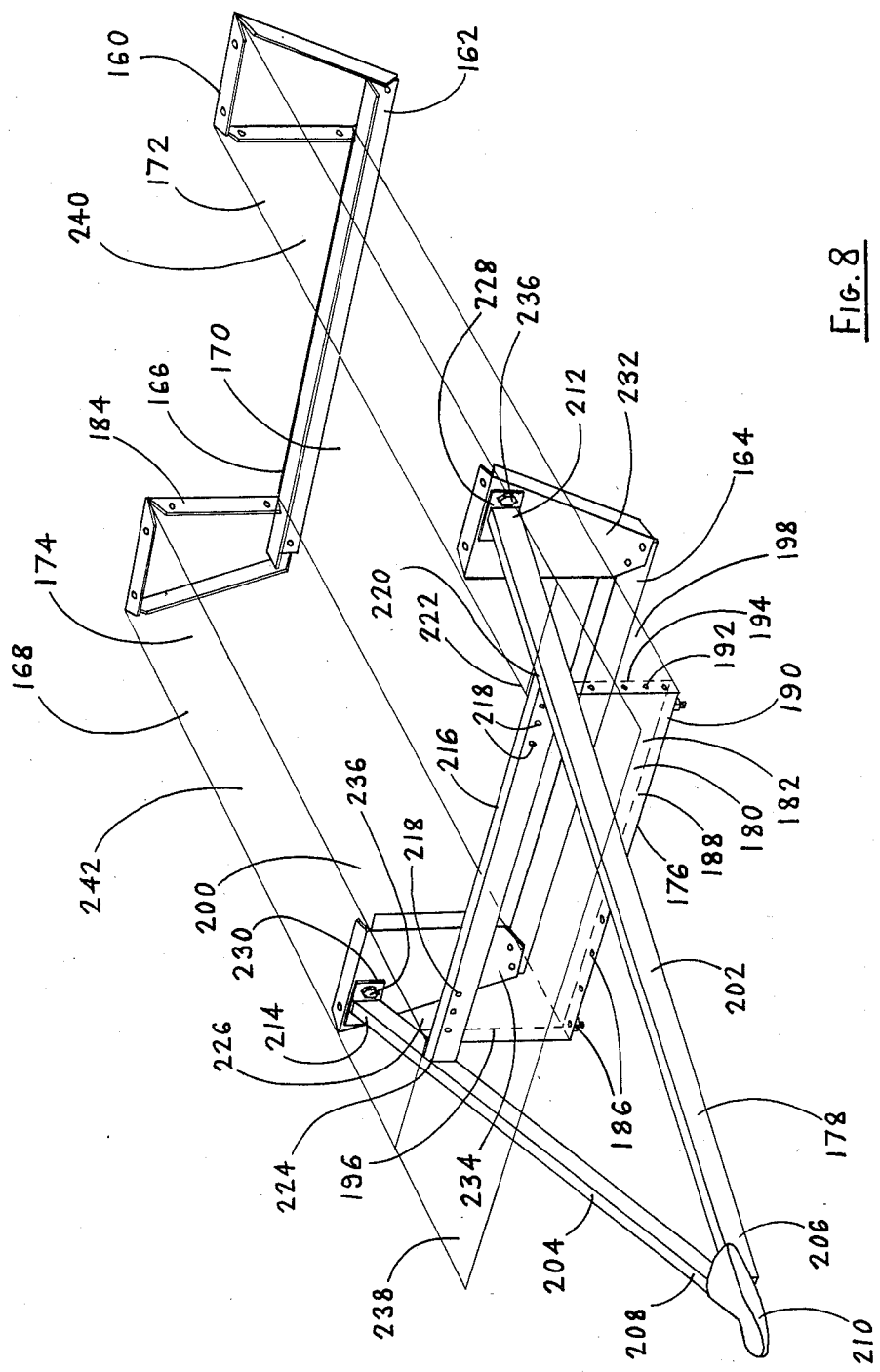
FIG. 8 is a perspective view of a preferred load bed and "A" frame coupling structure assembly, showing floor and formed side panels in ghosted outline.

Referring to FIG. 8; the load bed 160 in preferred form incorporates two lateral support structures 162,164. A rear lateral support structure 162 is located at or close to the rear edge 166 of the load floor structure 168 comprising a central floor panel 170, a left formed panel 172 and a right formed panel 174. A forward lateral support structure 164 is located a short distance aft of the forward edge 176 of said load floor structure 168, said short distance being determined by geometric considerations in attachment of the "A" frame coupling structure 178 to the load bed assembly 160.

A lateral forward wall 180 is incorporated in the preferred load bed 160, joined to said central floor panel 170, and left formed panel 172 and said right formed panel 174, so that said load bed 160 has a closed forward end 182 and an open rear end 184. Said forward wall 180 is attached to the inverted top hat section load floor structure 168 with fastener means 186 through a horizontal right angle flange 188 which overlaps the forward end 190 of the central floor panel 170 and by suitable fastener means 192 through left and right vertical right angle flanges 194,196, which overlap the vertical wall 198 of said left formed panel 172 and the vertical wall 200 of said right formed panel 174 respectively. Said horizontal right angle flange 188 and said left and right vertical right angle flanges 194,196 may be integral to said forward wall 180 or may be separate angle sections fastened between intersecting surfaces.

The "A" frame coupling structure 178 comprises a left structural bar leg 202 and a right structural bar leg 204 joined at their forward ends 206,208 to a common coupling bracket 210 and joined toward their rearward ends 212,214 to a structural bar crossmember 216 so as to create a symmetric "A" form in plan view. The structural bar crossmember 216 is attached to the load bed assembly 160 with suitable fastener means 218 toward its joint 220 with said left structural bar leg 202 in proximity to the upper forward corner 222 of the main vertical wall 198 of the left formed panel 122, and toward its joint 224 with said right structural bar leg 204 in proximity to the upper forward corner 226 of the main vertical wall 200 of the right formed panel 174. The left structural bar leg 202 and the right structural bar 204 extend rearward from said crossmember 204, outboard of said left and right main vertical walls 198,200 and are attached via suitable welded feet 228,230 to the left and right formed brackets 232,234 of the forward lateral support structure 164 with suitble fastener means 236.

A first design of "A" frame, as shown in FIG. 8, allows an upper forward floor surface 238 to be provided, extending forward from, and at the same level as, the left and right upper floor surfaces 240,242 above said structural bar crossmember 216, said left structural bar leg 202 and said right structural bar leg 204.

Referring to FIGS. 9, 9a; a second design of "A" frame 244 is shown which maximises usable cargo space within the load bed 246 for a trailer having a forward panel 248 which extends upward above the "A" frame 244 from the load bed forward vertical wall 250. This is achieved by employing a lateral structural bar 252 of a cross-sectional form having a first wall 254 joining a second wall 256 at right angles, with said first wall 254 welded to the upper surfaces 257 of the left and right structural bar legs 258,260 and extending forward from said second wall 256 which is attached with suitable fastener means 262 to said load bed forward vertical wall 250 and said forward panel 248 and extends outward on both sides to provide forward support to the left upper horizontal floor surface 264 and the right upper horizontal floor surface 266 via suitable attachment means 268.

Referring to FIG. 10; a third form of attachment of "A" frame structure 270 to load bed assembly 272 is illustrated in a fragmentary plan view of the left side. This alternate "A" frame is the same as described for FIGS. 9, 9a except that, in place of a structural crossmember, an attaching bracket 274 is welded to each structural bar leg 276 at a location toward, but just forward of the rear end 278 of said leg 276, said brackets 274 being attached by suitable fastener means 280 to a structural bar crossmember 282 of full trailer width at a location toward an end 284, the structural bar crossmember 282 being further attached by suitable fastener means 286 to, or otherwise forming an integral part of, the forward wall 288 of said load bed assembly 272 in proximity to the forward upper corner 290 of each formed panel 292. This third alternate design of "A" frame allows a means of attachment to the load bed which facilitates assembly and disassembly via threaded fasteners 280,293 and, by providing a horizontal flange 294 facing rearward from the forward wall 288, provides a structural location for convenient attachment of tie-down systems used to hold such cargo as motorcycles or snowmobiles in position for transportation.

Figure 11:
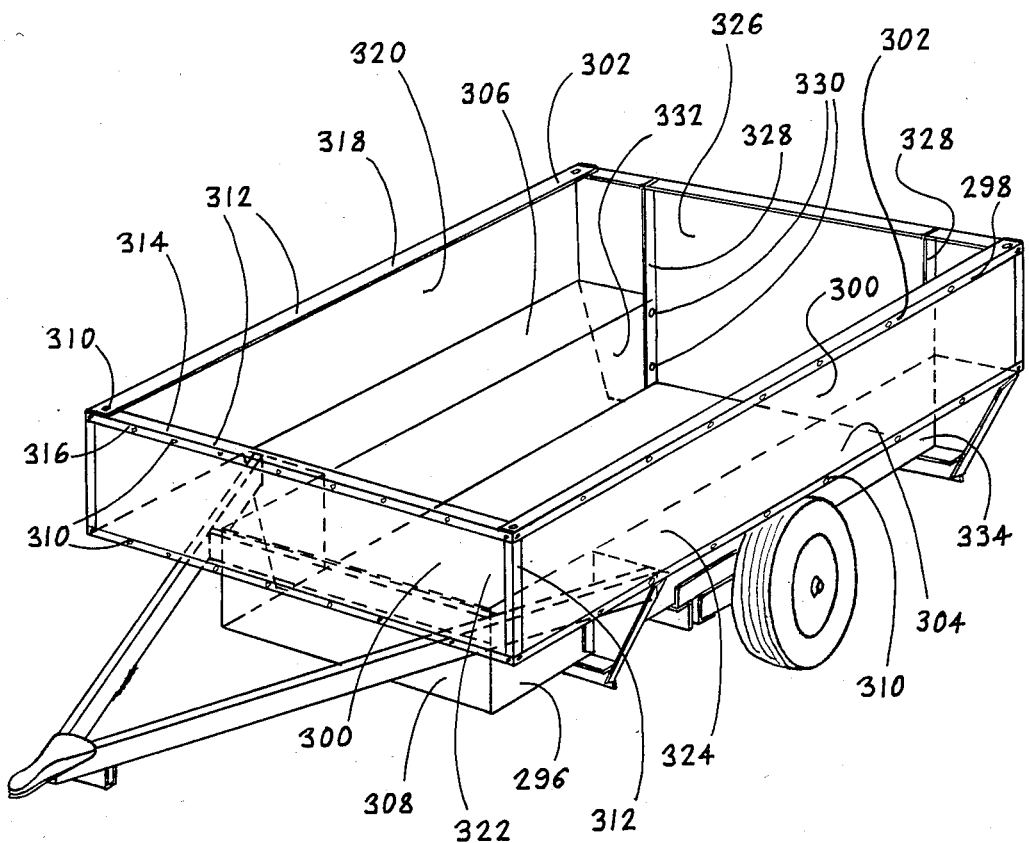
FIG. 11 is a perspective view from the front of an open trailer incorporating a preferred load bed and coupling structure assembly.

Referring to FIG. 11; a load bed and coupling structure assembly 296 as heretofore described can be seen to be readily adapted to an open cargo trailer 298 by the addition of vertical panelling 300 and a suitable supporting framework 302 for said panelling, attached along the outer edges of the left and right upper floor surfaces 304,306 and along the upper edge of the forward wall 308 with use of suitable fastener means 310. In the preferred design, said supporting framework 302 primarily comprises structural bars 312 having a first flat wall 314 integrally connected to a second flat wall 316. Such structural bars 312 are used to provide a rigid supporting edge 318 to a side panel 320, or to provide a means of attaching a first panel 322 at right angles to a second panel 324.

An open trailer as heretofore described and shown in FIG. 11 can be seen to provide cargo floor space and cargo containment to the full trailer width as determined by dimensions across the tires, while at the same time providing a central floor which is as low as allowed by requirements for ground clearance and for tire and associated suspension component clearances. The configuration of panels is also seen to be easily adapted to use of a removable or hingedly attached tailgate 326 located between, and supported by, posts 328 attached with suitable fastener means 330 to the rear edges of the left and right formed side panels 332,334; said tailgate 326 being of width approximately matching that of the central floor panel 336.

Figure 12:
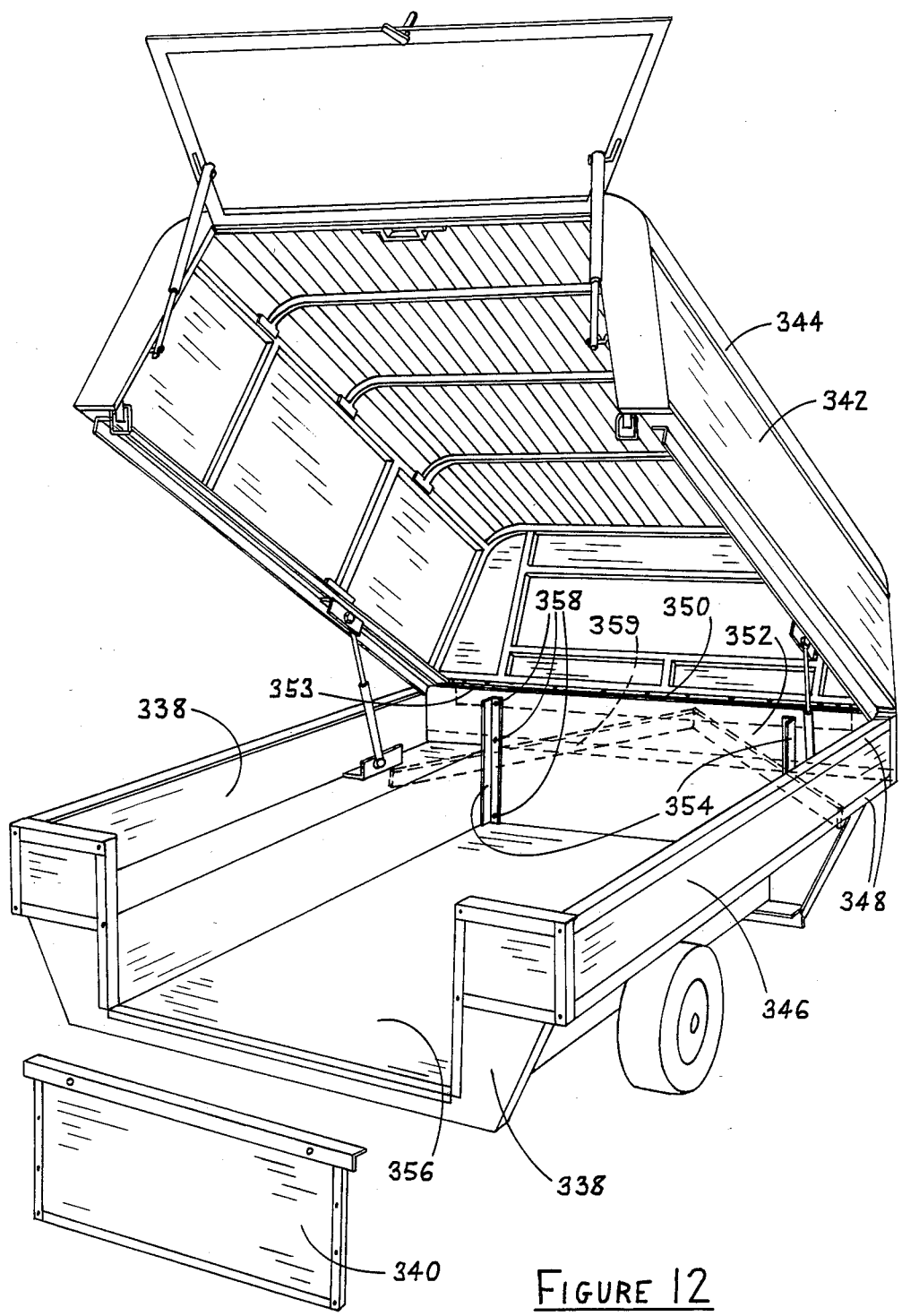
FIG. 12 is a perspective view from the rear of a lift roof trailer incorporating a preferred load bed and coupling structure assembly.

Referring to FIG. 12; it can be seen that an open cargo trailer 338 (298 in FIG. 11) and tailgate 340 (326 in FIG. 11) as heretofore described can also be readily adapted to a closable lift-roof trailer 342 by the mounting of a forward-hinged cover 344 above the cargo-containing panelling 346 and supporting framework 348. In order to add rigidity to the lateral structural bar 350 which is used to form the upper finishing edge to the forward vertical wall 352 of the base cargo trailer 338 and provide firm support for a forward hinged attachment 353 of the cover or lift-roof 344, structural members 354 may be employed so as to extend vertically above the central floor 356, said members 354 being attached with suitable fastener means 358 to the "A" frame coupling structure 359 and to said forward wall 352. (It is to be noted that the open cargo trailer 338 shown in FIG. 12 is the preferred form of trailer base to be employed in the Lift-Roof Trailer described in patent application filing Ser. No. 474,963, U.S. Patent and Trademark Office receipt date Mar. 14, 1983).

Figure 13:
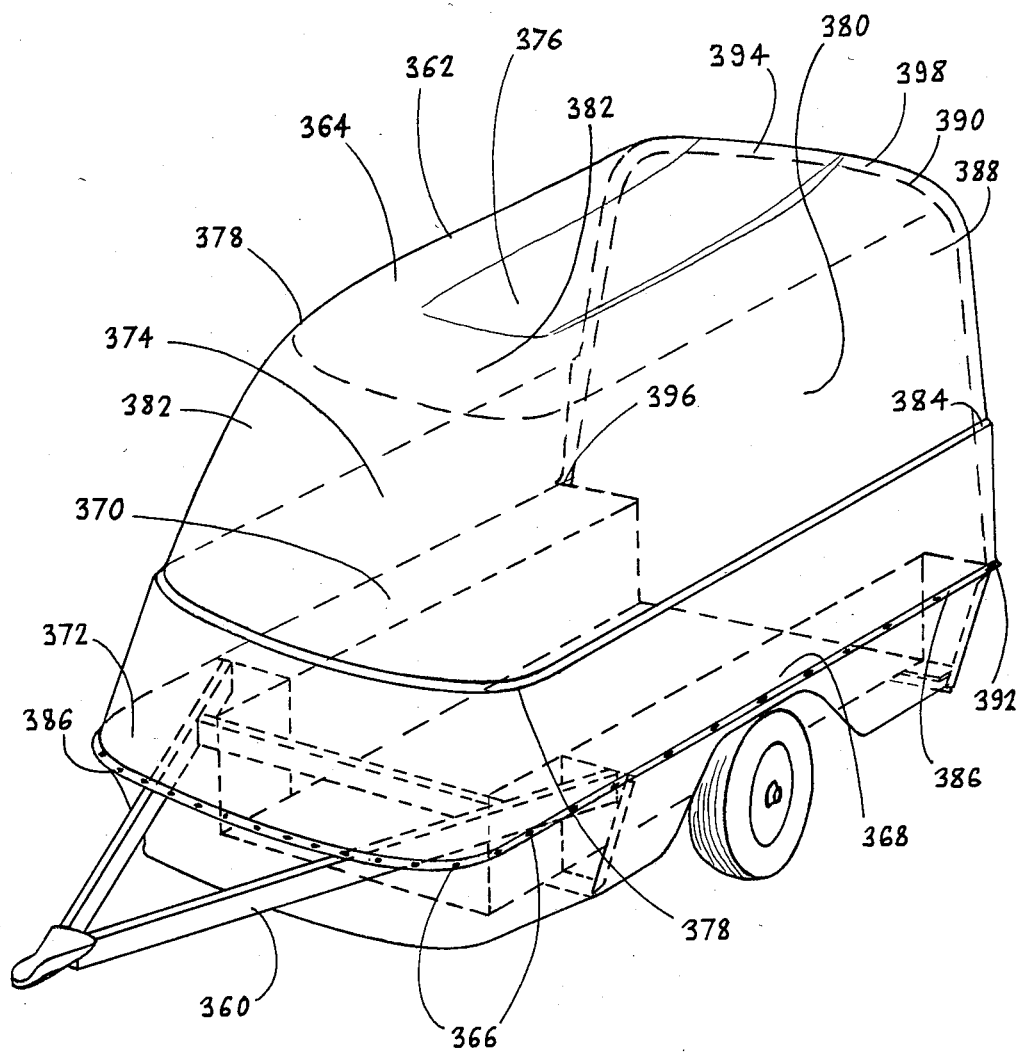
FIG. 13 is a perspective view from the front of a trailer incorporating a preferred load bed and coupling structure assembly with a molded shell closed body.

Referring to FIG. 13: a load bed and coupling structure assembly 360, as heretofore described, may also be conveniently adapted to a fixed closed body trailer 362 by use of a one-piece fiberglass reinforced molded plastic shell 364 attached with suitable fastener means 366 to the upper horizontal surfaces 368,370,372 of said load bed and coupling structure assembly 360. The preferred molded shell 364 includes the following features: a forward wall 374 having a slope as seen in side view of approximately thirty degrees from vertical and rising rearward toward a roof 376; smooth curves 378 from the forward wall 374 blending into the roof 376 and side walls 380,382 in order to provide rigidity and aerodynamic efficiency; a left side wall 380 and a right side wall 382 angled inward toward the roof 376 in such a manner as to satisfy mold separation requirements; a horizontal change of section of "Z" form 384, typically at about one third to one half of the height of the shell 364, in order to provide lengthwise sidewall rigidity; walls 380,382 carried into a continuous outward facing horizontal flange 386 in order to provide for attachment to the load bed left upper floor 368, right upper floor 370 and forward upper floor 372 at their outer periphery by suitable fastener means 366; full opening at the rear 388 except for a flange 390 which is carried from the lower rear edge at the left side 392 up and across the trailing edge of the roof 376 and down to the lower rear edge at the right side 396, the purpose of which rear flange 390 is to provide structural reinforcement at the rear opening 388 and a suitable rigid mounting surface 398 for attachment of alternate forms of rear access door, door frame and/or seals. As described, a shape is provided which can be molded in one piece with a simple molding technique similar to that applied to the molding of boat hulls, is conveniently attachable to to the preferred load bed and coupling structure assembly, provides an aerodynamically efficient closed body transportation container having high structural rigidity with large volume and relatively low weight, low manufacturing complexity and low manufacturing cost.

Figure 14:
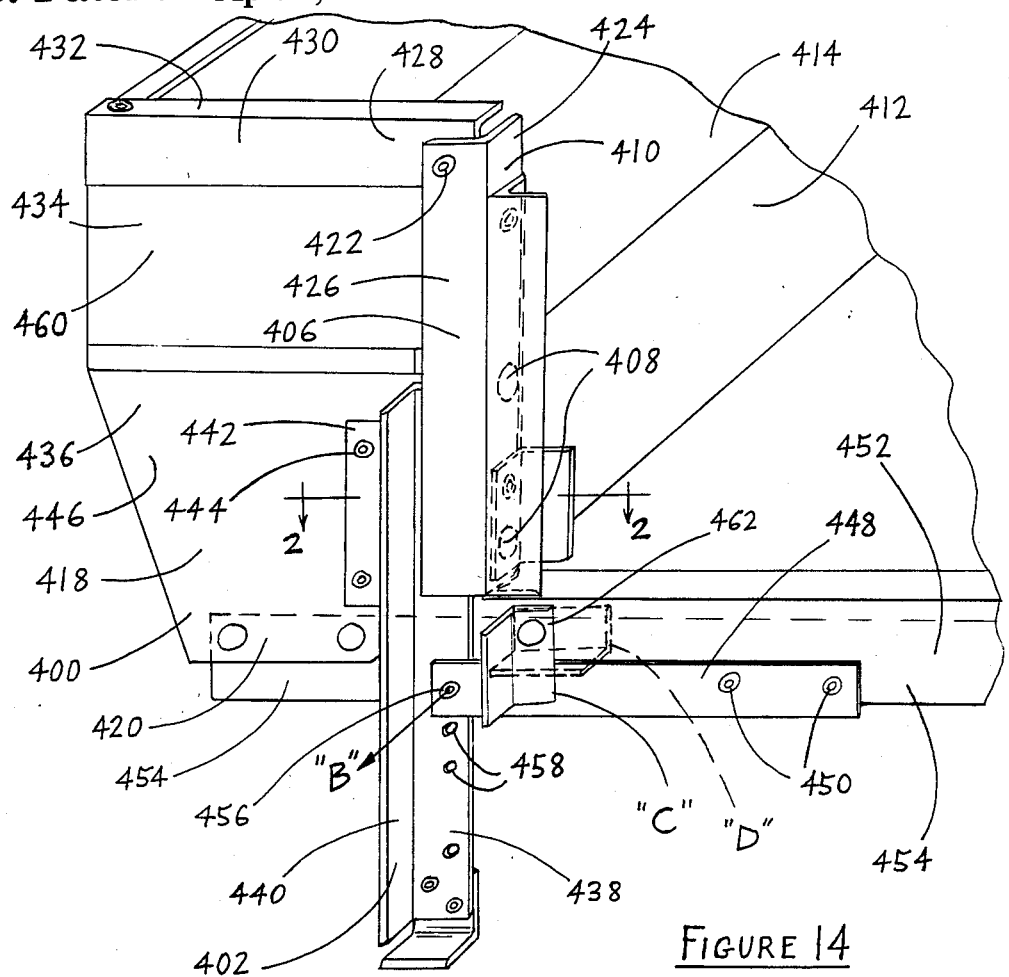
FIG. 14 is a fractional perspective view from the rear showing a rear sliding support leg.
Figure 14A:
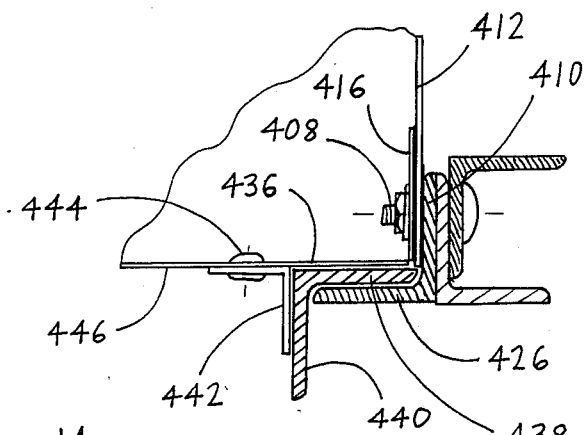
FIG. 14a is a sectional view as seen along lines 2—2 of FIG. 14.

Referring to FIGS. 14 and 14a; a load bed and coupling structure assembly 400 as heretofore described is shown to be adaptable to mounting of a pair of adjustable, vertically sliding leg stands 402 at the rearward end 404 of said assembly 400. A retaining angle 406 is attached by suitable fastener means 408 passing through a first wall 410 of said retaining angle 406, through the rear edge of the vertical wall 412 of the formed panel 414 and through the vertical flange 416 of the rear formed bracket 418 (of the rear lateral support structure 420); said retaining angle 406 is also attached by suitable fastener means 422 at its upper end 424 through the second wall 426 to the inboard end 428 of a horizontal structural angle bar 430 which forms an upper finishing edge 432 to the trailer rear panel 434. Said retaining angle 406 is attached in a spaced relationship to the rear panel 434 and the formed bracket 418 which together comprise the trailer rear wall 436, so that a first wall 438 of a vertically sliding leg stand 402, formed from structural angle having a first wall 438 at right angles to a second wall 440, may be positioned with a slidable fit between the trailer rear wall 436 and the second wall 426 of said retaining angle 406. A capture bracket means 442 is attached by suitable fastener means 444 to the rear surface 446 of the formed bracket 418 so that, in combination with said retaining angle 406, said capture bracket means 442 constrains said leg stand 402 to a vertical sliding movement.

A horizontal spring bar 448 is attached with suitable fastener means 450 to the rear vertical wall 452 of the lateral cross member 454 of the rear lateral support structure 420 so that a lockpin 456, attached to said spring bar 448 is forced by spring action against the first wall 438 of the vertically sliding leg stand 402 and may be brought into engagement with holes 458 in said first wall 438 when said vertically sliding leg stand 402 is moved vertically to a desired position for travel or to alternate positions providing ground support to the rearward end of the trailer 460. For purposes of safety, a latch bar 462 is pivotally attached to the rear vertical wall 452 of the lateral structural bar 454 of the rear lateral support structure 420; said latch bar 462 having a first position "C" overlapping the spring bar 448 with the lockpin 456 in an engaged position so that said lockpin 456 is locked in the engaged position with the legstand 402 which is then therefore safely retained in the chosen position; said latch bar having also a second position "D" clear of said spring bar 446 so that release of the lockpin 456 is allowed from an engaged position in direction of arrow "B".

Figure 15:
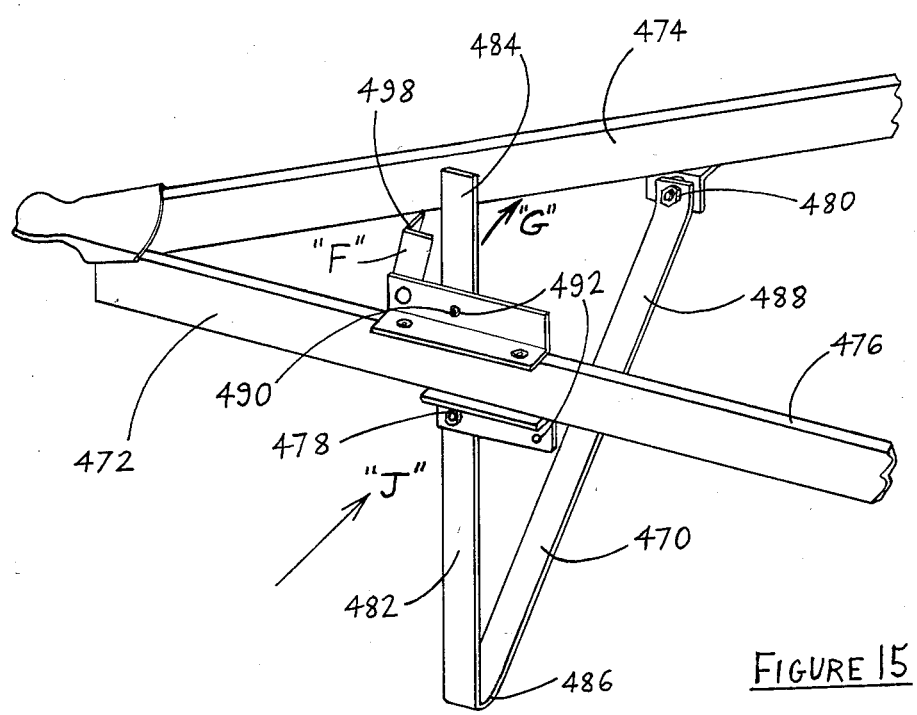
FIG. 15 is a fractional plan view of an "A" frame-mounted pivoting support "V" frame.
Figure 15A:
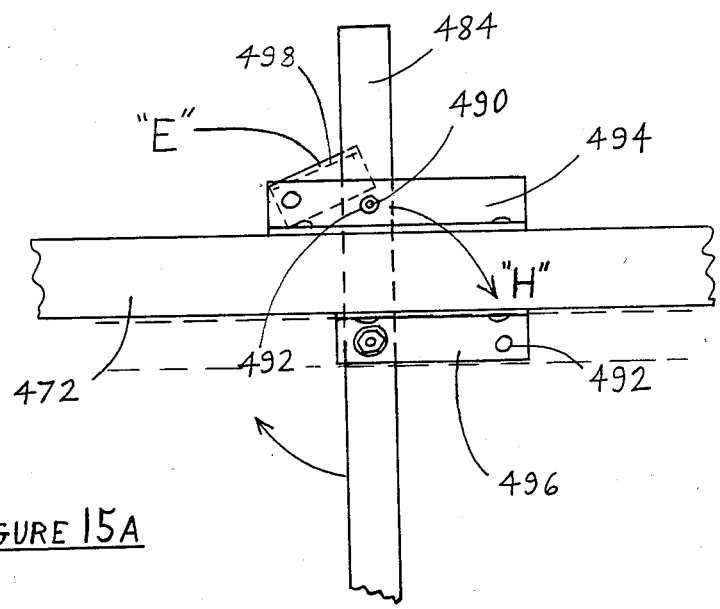
FIG. 15a is a view in direction of arrow "J" on FIG. 15.

FIGS. 15 and 15a show a "V" frame support 470 which is pivotally attached to the "A" frame legs 472,474 for the purpose of providing a means of supporting the "A" frame and load bed structure 476 in an approximately horizontal position when stationary and unattached to a tow vehicle. Said "V" frame support 470 is attached through a first pivot 478 on the A-frame left leg 472 and through a second pivot 480 on the A-frame right leg 474, said pivots 478,480 being located so as to provide a horizontal "V" frame pivot axis at right angles to the "A" frame left leg 472, as seen in plan view. The "V" frame support 470 is formed with a first leg 482 which is pivoted at said first pivot 478 with its length approximately at right angles to the pivot axis and has a spring handle 484 which forms an extension of said first leg 482 beyond the pivot 478 away from the crotch 486 of the "V" frame where the first leg 482 joins the second leg 488, and which is relatively flexible in a direction parallel to the pivot axis. The spring handle 484 mounts a lockpin 490 which, with rotation of the V-frame support 470 may be brought into engagement with one or more holes 492 in surfaces 494,496 which are fixed relative to the A-frame left leg 476 in a plane at right angles to the pivot axis, so that said V-frame support 470 may be held in an approximately horizontal position or an approximately vertical position by the spring action of said spring handle 484 tending to force the lockpin 490 into engagement with a holes 492 in the fixed surfaces 494, 496. A pivoted latch bar 498 is provided having a first position "E" overlapping the spring handle 484 with said spring handle 484 in the approximately vertical position with the lockpin 490 engaged so as to function as a locking means, and having also a second position "F" clear of said spring handle 484, so as to allow release of the lockpin 490 from an engaged position in direction of arrow "G". The "V" form support 470 may be moved from a vertical position as shown in solid line in FIG. 15a to a horizontal position as shown in broken outline by moving the handle 484 in a rearward arc, as indicated by arrow "H".

I claim:

1. For a flat-floored trailer having wheels, a load bed and coupling structure assembly including a load floor structure having a lateral cross section in the form of an "inverted top hat" and comprising a central rectangular floor panel attached by suitable fastener means along each longitudinal edge to the lower horizontal flange of a formed panel incorporating a lateral section of "Z" form with a vertical wall joining the lower horizontal flange to an upper horizontal flange or floor surface; the right formed "Z" section panel being a mirror image form of the left formed "Z" section panel and each formed panel being shaped in a parallel configuration of bends and edges and being of approximately the same length as the central rectangular floor panel;

said load floor structure being supported in the desired "inverted top hat" cross-sectional form by attachment to forward and rearward rigid lateral support structures incorporating surfaces for attachment of the left and right formed panels and for support of the central floor panel; a vertical front wall being attached to the forward edges of the central floor panel and vertical walls of the left and right formed panels so that, together in assembly with the lateral support structures, a load bed is formed having a closed forward end;

said load bed being attached to an "A" frame coupling structure comprising left and right structural bar legs joined at their forward ends to a common coupling bracket and joined toward, but forward of, their rearward ends to a common structural bar cross member; said "A" frame coupling structure being attached to the forward end of the load bed at locations in proximity to the joints between the structural bar cross member and the left and right structural bar legs and being attached at the rearward ends of the left and right structural bar legs to the forward lateral support structure toward the left and right edges of said support structure outboard of the formed panel vertical walls and below the formed panel upper horizontal flange or floor surfaces.

2. The combination as defined in claim 1 with an open body for cargo containment, comprising vertical upper panels attached by suitable fastener means to a supporting framework of structural bars; each structural bar including a pair of walls integrally connected to one another; said upper panels and supporting framework being attached by suitable fastener means to the upper peripheral edges of the load bed and including vertical posts attached to the rearward edges of the vertical walls of the load floor structure left and right formed panels for the purpose of accommodating a hingeable and/or removable tailgate so that, with the tailgate retained in position, a full enclosure of vertical walls is provided.

3. The combination of an "A" frame coupling structure with a forward pivoted support frame of "V" form compising a left and a right leg joined at the crotch of the "V" form, said "V" frame support left leg being attached via a left pivot means to the left leg of the "A" frame coupling structure and said right leg being attached via a right pivot means to the right leg of the "A" frame coupling structure so that the "V" frame support may be rotated about a horizontal axis perpendicular in plan view to a first leg of the "A" frame coupling structure;

the leg of said pivoted "V" frame support which is pivotally attached to said first leg of the "A" frame coupling structure incorporating a spring handle extending away from the crotch of the "V" form; said spring handle being relatively flexible in a direction parallel to the pivot axis and carrying an attached lockpin which may be forced by the spring action of said spring handle into engagement with one or more holes which are fixed relative to said "A" frame coupling structure first leg in a vertical plane at right angles to said pivot axis and located in such a manner as to provide alternate fixed orientations of the "V" frame support in approximately vertical or horizontal planes as viewed along the pivot axis;

a latch bar being pivotally attached relative to the fixed holes and having a first position overlapping the spring handle in such a manner as to hold the lockpin into engagement with the fixed hole which locates the "V" frame support approximately in a vertical orientation and having a second position clear of the spring handle such as to allow release of the lockpin from engagement with said fixed hole under forced deflection of said spring handle.

4. The combination as defined in claim 1 with a forward means of supporting the "A" frame coupling structure approximately parallel to the ground as seen in side view and two rear support legs fabricated from structural bar having two walls integrally connected one to another; a first wall of each support leg being located with a sliding fit between the rear lateral wall of the load bed and a first wall of a vertical retaining angle bar which is attached through its second wall, via suitable fastener means, to the rearward edge of the vertical wall of the load bed left or right formed panel;

said support leg being further retained and constrained to a vertical sliding movement against said retaining angle by a capture bracket means attached to a rear vertical face of the load bed; and with a horizontal spring bar attached to a rear vertical face of the load bed rear lateral support structure in proximity to each support leg so that a lockpin attached to said spring bar is forced by spring action against the first wall of the proximate rear support leg, which may be moved vertically to bring said lockpin into engagement with holes providing alternate adjustment vertical positions for the support leg relative to the load bed;

a latch bar being pivotally attached to a rear vertical face of the load bed rear lateral support structure, having a first position overlapping the spring bar with the lockpin in an engaged position, so that said lockpin is positively retained in said engaged position with a hole in the support leg, and having a second position clear of the spring bar, so that the lockpin may be disengaged from the support leg by forced deflection of the spring bar.

* * * * *